May 29, 1951            C. A. RERICK            2,554,637
FERTILIZER SPREADER AND GRAIN DRILL
Filed Oct. 25, 1948            4 Sheets-Sheet 1
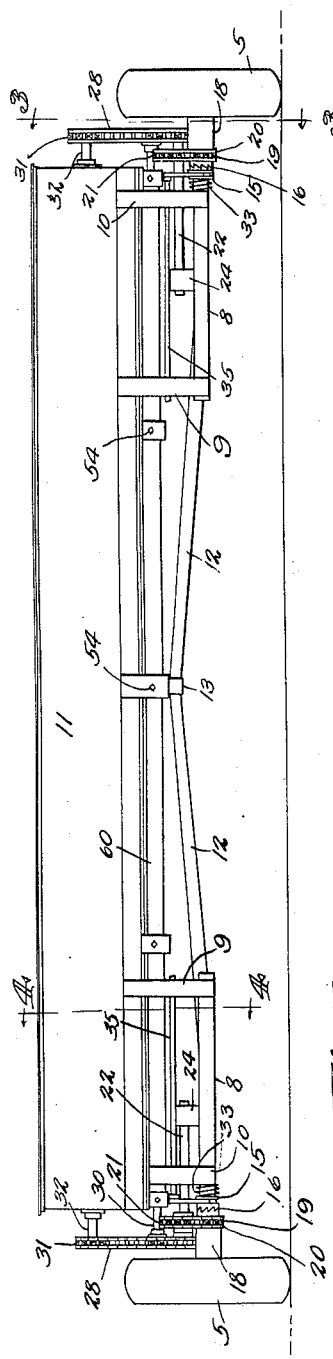
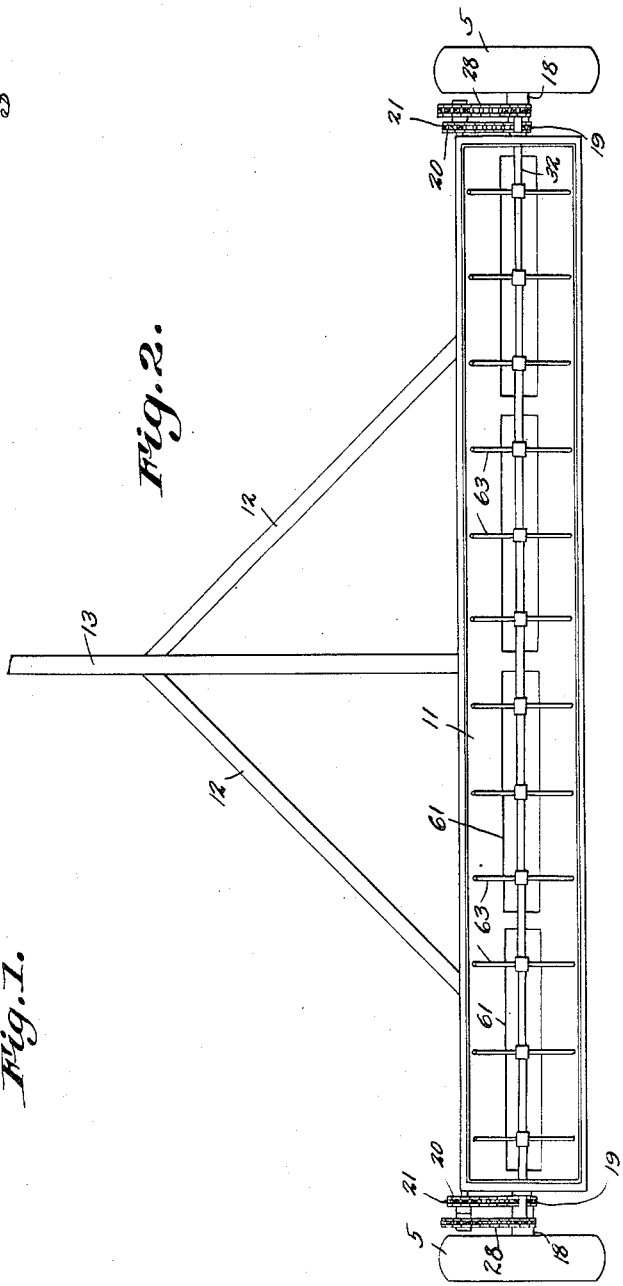
C. A. Rerick
INVENTOR
BY *C. A. Snow & Co.*
ATTORNEYS.

May 29, 1951

C. A. RERICK 2,554,637

FERTILIZER SPREADER AND GRAIN DRILL

Filed Oct. 25, 1948

C. A. Rerick
INVENTOR

BY *CA Snow & Co.*
ATTORNEYS.

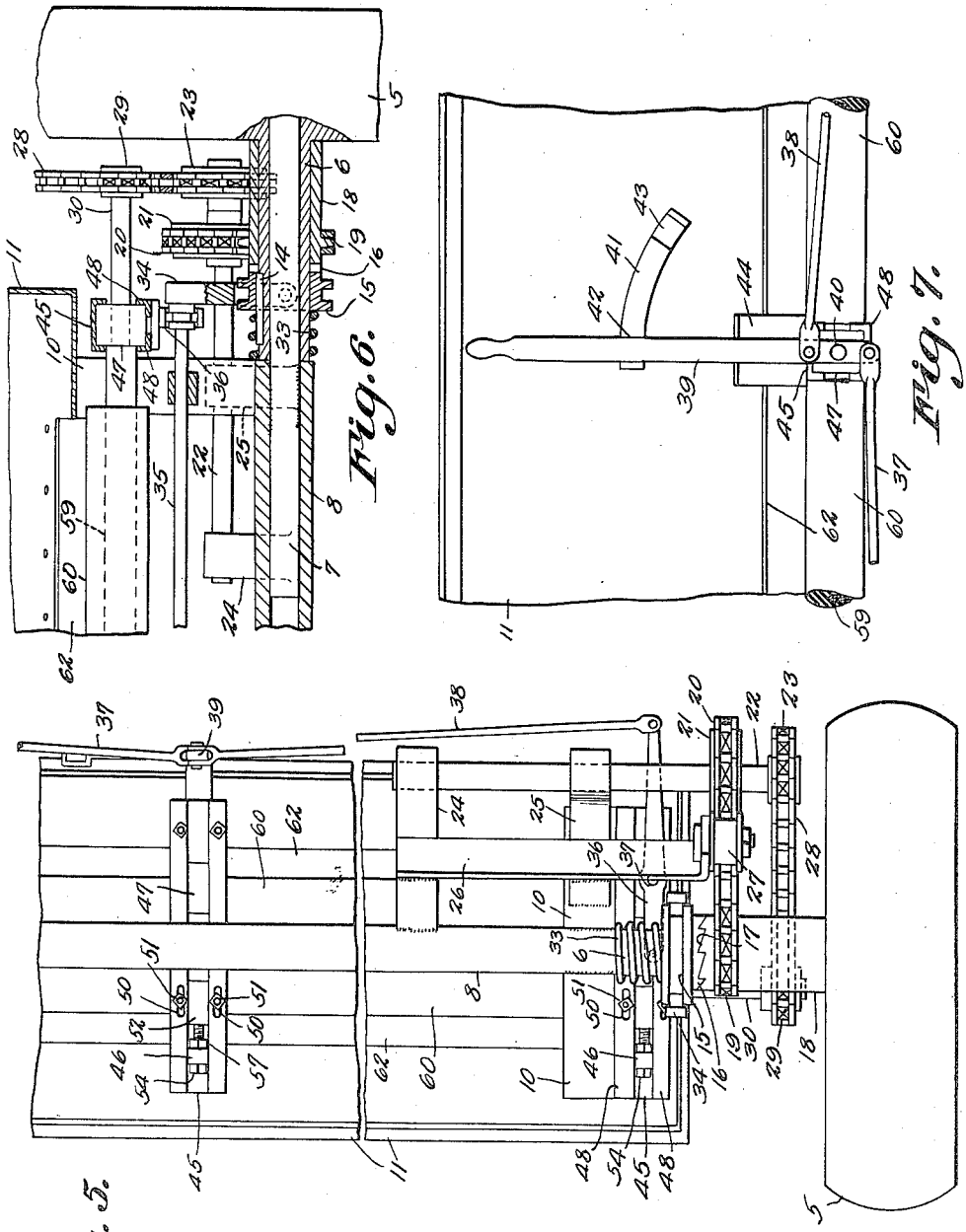

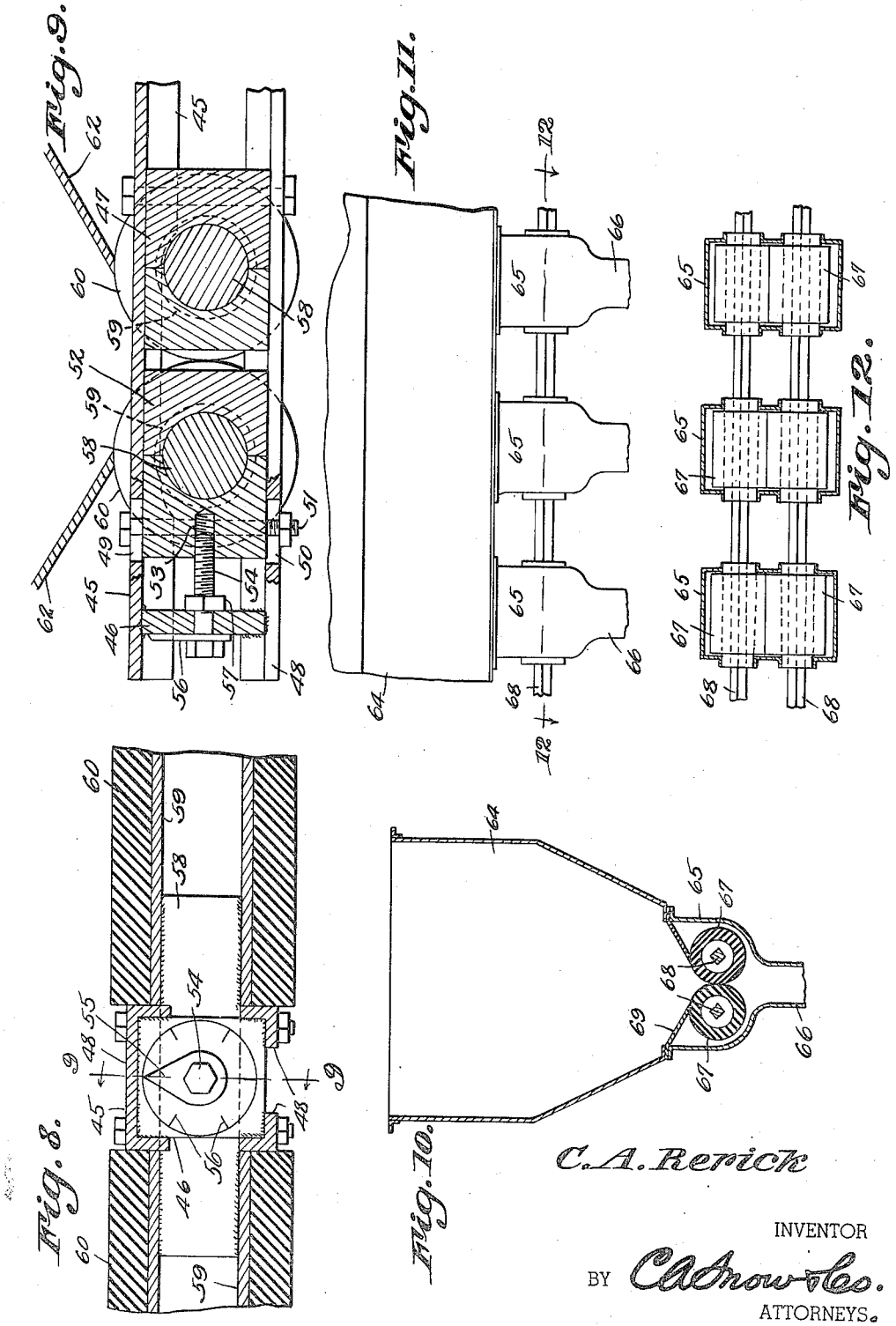

Patented May 29, 1951

2,554,637

UNITED STATES PATENT OFFICE 2,554,637

FERTILIZER SPREADER AND GRAIN DRILL

Charles A. Rerick, Milan, Kans.

Application October 25, 1948, Serial No. 56,341

1 Claim. (Cl. 222—267)

This invention relates to a machine for spreading fertilizer, the machine being adapted also for service as a grain drill.

An important object of the present invention is to provide a machine of the character described embodying oppositely rotating rollers through which the material is fed, said rollers being novelly designed with resilient covering of a material such as soft rubber, said rollers being adapted to permit indefinite use of the machine without cleaning, and said machine being also adapted to prevent breakage of the grain as it is drilled.

Another important object of the present invention is to provide a machine of the character described in which novel adjustment means will be provided for the rollers, as a take up for wear and for the purpose of adjusting the spacing of the rollers for spreading of different types of material.

Another important object is to provide a machine as described adapted to be driven from both ends thereof, by means of a driving connection extending from the ground wheels of a machine, the construction being adapted to provide positive drive from opposite ends of the machine, in a manner wherein the material to be spread will not interfere with the driving connections, and said opposed driving connections being adapted for simultaneous clutching and declutching.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1 is a rear elevational view of a machine constructed in accordance with the invention.

Figure 2 is a top plan view.

Figure 5 is a fragmentary bottom plan view.

Figure 6 is a fragmentary longitudinal section through one end of the machine.

Figure 7 is a fragmentary front elevation of the central portion of the machine showing the means for simultaneously operating the clutching mechanisms at opposite ends of the machine.

Figure 8 is an enlarged section across one of the roller adjustment means.

Figure 9 is a section on line 9—9 of Fig. 8.

Figure 10 is a transverse section through a modified form of hopper and rollers, whereby the machine is adapted for drilling grain.

Figure 11 is an elevation of the form of Fig. 10.

Figure 12 is a section substantially on line 12—12 of Fig. 11.

Figure 4:
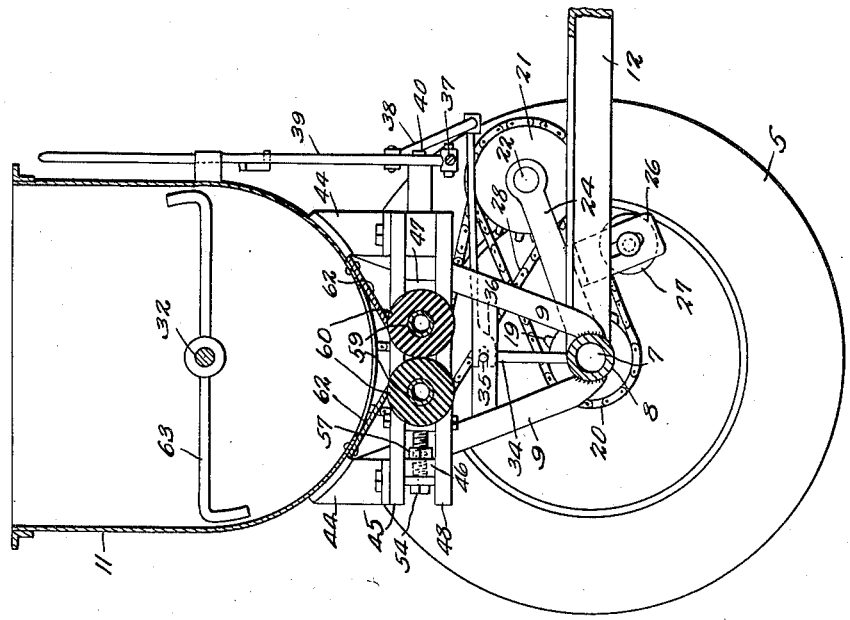
Figure 4 is an enlarged section substantially on line 4—4 of Fig. 1.
Figure 3:
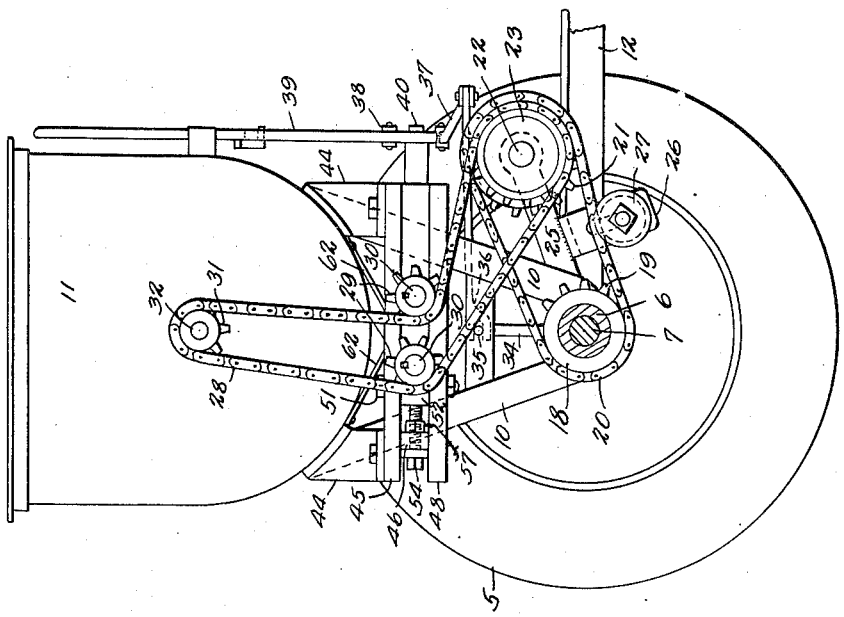
Figure 3 is an enlarged section on line 3—3 of Fig. 1.

Referring to the drawings in detail 5 are the ground wheels of the machine each wheel having the inwardly extended sleeve-like hub 6, whereby the wheel may rotate on the stub axle 7. Each axle 7 is extended into a tubular member 8, and the axles are welded or otherwise fixedly secured in said tubular members.

Fixedly secured to the respective tubular members, as by welding or the like, are the upwardly diverging frame members 9 and 10, supporting the elongated hopper 11.

Also fixedly secured to the tubular members 8, and converging forwardly of the machine, are the braces 12, that are secured at their forward ends to the draw bar 13.

Splined to each hub 6, as at 14, is a clutch 15, having the clutch face 16. Sleeve 18 is mounted on each hub 6 and rotates independently thereof, and each sleeve 18 has the clutch face 17 adapted for clutching engagement with the clutch face 16. Therefore, sleeve 18 will rotate with ground wheel 5 only when engaged by clutch 15.

Rigid with each sleeve 18 is a sprocket 19, around which passes chain 20 that also passes around sprocket 21 that rotates the shaft 22 thus to rotate the sprocket 23 also secured to said shaft. Shaft 22 is journaled in the bearing members 24 and 25 extending from the frame of the device hereinbefore described.

Rigidly secured to the bearing members 24 and 25, as by welding or the like, is the arm 26 carrying the idler wheel 27, thus to maintain tension on the chain 20. Wheel 27 is adjustable relative to the bearing arm for adjustment of the tension of said chain.

Passing around the sprocket 23 is a chain 28, adapted to rotate the sprockets 29 in opposite directions, said sprockets being keyed to, and adapted to rotate, the roller shafts 30. Chain 28 also passes around the sprocket 31 that rotates the agitator shaft 32.

By reason of the construction which has so far been described, it may be noted that a drive is provided at both ends of the machine, said drive being identical at each end. Assuming that the clutch is engaged, rotation in opposite directions will be transmitted to the feed roller shafts 30, and rotation will also be transmitted to the agitator shaft 32. Obviously, the speed of rotation can be varied by substitution of sprocket wheels of different sizes for those already mounted on the machine.

The clutch is held normally engaged by a spring 33. However the clutch can be disengaged against the action of the spring, by movement of clutch disc 15 by the shifting forks 34 extending around the clutch disc. Shifting forks 34 extend downwardly from rod 35, adapted to be reciprocated by operating lever 36 fulcrumed intermediate its ends to the machine frame. Operating lever 36 at one end of the machine has extending from it the operating rod 37, and the operating lever 36 at the other end of the machine has extending from it the operating rod 38. The operating rods 37 and 38 extend toward the center of the machine, and are respectively pivotally connected to an operating handle 39, said connections of the rods to the operating handle being at opposite sides of the fulcrum point 40 of said operating handle. As a result, it can be seen that the drive at opposite ends of the machine can be simultaneously declutched or engaged by movement of the operating handle in one direction or another, as the case may be. The operating handle is retained in its extreme positions to which moved by means of segment 41 having the notches 42 and 43.

Secured to the hopper 11, and depending therefrom at spaced intervals longitudinally of the hopper, are the opposed pairs of brackets 44, and secured to each pair of brackets and extended transversely of and below the hopper are the channels 45 having fixedly secured thereto the depending rectangular plates 46. Said plates 46 are secured to the channels near one end of the channels. Adjacent the other end of the channels, there are secured thereto the bearings 47, and secured to the undersides of the plates 46 and bearings 47 are the angles 48. Angles 48 and channels 45 are slotted as at 49 and 50 to receive bolts 51 that pass through the bearings 52. Thus, bearings 52 can be adjusted longitudinally of the channels and angle members, but bearings 47 are fixed in position.

For the purpose of adjusting the bearings 52, I provide threaded sockets 53 therein, these receiving adjusting bolts 54 to which are secured index arms 55.

The adjusting bolts are threaded in the plates 46, and thus, by partial rotation of the adjusting bolts, it becomes possible to adjust the bearings 52 toward the bearings 47, or away from the bearings 47, as desired.

Each index arm 55 is adapted to traverse the graduations 56 on the respective plates 46, so that the person making the adjustment can make said adjustment with accuracy and to the exact extent desired, and can additionally adjust each of the several bearings 52 no more or no less than each other bearing 52, thus to retain the bearings all in alignment after the adjustments have been made.

After the adjustments have been made, the adjusting bolts are secured against further rotation by means of the lock nuts 57.

Journaled in the respective bearings 47 and 52 are the stub shafts 58, the ends of which extend into and are rigidly secured in a plurality of longitudinally aligned tubular core members 59. Each core member 59 is covered with a soft resilient material, such as soft rubber, as shown at 60, thus to provide longitudinally aligned feed rollers, the two longitudinal sets of feed rollers oppositely rotating by reason of the driving means hereinbefore described, and normally being in engagement, so that the material can be fed therebetween.

Above each roller 60 is formed an opening 61 of the hopper. The material to be spread drops down through the opening 61, and is fed between the rollers by the provision of rubber flaps 62 overlying the respective rollers. So that a steady flow of material can be assured, I provide the agitator 63 that is rotated on the agitator shaft whenever the driving connection with the ground wheels is engaged.

In Figs. 10, 11, and 12 I have illustrated a modified form wherein the machine is adapted for use as a grain drill. In this modified form, there is provided the grain box 64 which in general corresponds in shape and length to the hopper 11. The grain box or hopper 64 has a plurality of longitudinally spaced openings from which depend casings 65 having at their lower ends the spouts 66. Journaled in each casing in an oppositely rotating pair of rollers 67, that are rotated by means of the shafts 68 which, as will be understood, are oppositely rotated by means of the driving connections hereinbefore described. Rubber flaps 69 assure the feed of the material between the respective rollers 67, and said rollers are also covered with rubber, so as to prevent breaking of the grain as it is fed between the rollers.

Important characteristics of the invention may now readily be noted. A positive drive is provided for each end of the machine, which drive can be engaged or disengaged with ease, by manipulation of the operating handle. Said handle simultaneously engages or disengages the clutch, and on engagement of the clutch and movement of the machine on its ground wheels, material will be fed between the rollers.

When the machine is stopped, it is not necessary, before starting it again, to clean the feed mechanism. The machine is thus distinguished from machines using a metal feed mechanism, as distinguished from a rubber roller construction. In machines using a metal feed, the mechanism must be cleaned out if the machine is stopped only for a short time, as the fertilizer or other material to be distributed settles in the feed mechanism and causes breakage thereof. However, in the present invention, this difficulty is overcome, and the machine will start at any time without possibility of breakage or damage to the mechanism, this being possible because the rubber rollers yield slightly as the material passes therethrough, and additionally, there are no gears or similar devices in the path of the material as it is fed from the hopper for distribution.

Other important characteristics may also be noted. By reason of the adjustment means illustrated in Figs. 8 and 9, it is possible to make more or less minute adjustments on the several rollers, and said adjustments can be uniform throughout. Thus, take up for wear is possible, and additionally the adjustment permits spacing of the rollers for feeding of various types of material that have different characteristics or degrees of coarseness.

What is claimed is:

In a spreader an elongated hopper; pairs of channel members rigidly secured to and spaced longitudinally of the under side of said hopper, the channel members of each pair being vertically spaced to define a plurality of slideways spaced apart and extending transversely across the under side of said hopper; oppositely rotating rows of soft rubber covered rollers extended longitudinally of and below said hopper and positioned to receive material gravitating from the bottom of said hopper, the rollers of each row being spaced apart; stub shafts extending across the spaces between the respective rollers and connecting the rollers of each row for joint rotation; bearings fixedly mounted between the channel members of each pair of channel members, the stub shafts of one row of rollers extending through said bearings; bearings for the stub shafts of the other row of rollers mounted for sliding movement between the channel members of each pair; graduated plates fixedly mounted between the channel members of each pair adjacent each slidable bearing; adjusting screws threadable in each slidable bearing and mounted for rotation in the respective graduated plates; index arms rotatable with the respective adjusting screws and traversing the faces of said plates; and means for locking the adjusting screws in selected positions to which rotated.

CHARLES A. RERICK.

REFERENCES CITED

The following references are of record in the file of this patent:

UNITED STATES PATENTS

| Number | Name | Date |
| --- | --- | --- |
| 36,159 | Jones et al. | Aug. 12, 1862 |
| 46,947 | Schroeder | Mar. 2, 1865 |
| 282,456 | Hull | July 31, 1883 |
| 282,720 | Gunckel | Aug. 7, 1883 |
| 524,748 | Weber | Aug. 21, 1894 |